United States Patent [19]

Moser et al.

[11] 3,717,185
[45] Feb. 20, 1973

[54] DELIMBING ASSEMBLY FOR TREE HARVESTERS

[75] Inventors: Raymond L. Moser, Tremont; Dorrance Oldenburg, Peoria, both of Ill.

[73] Assignee: Caterpillar Tractor Co., Peoria, Ill.

[22] Filed: July 27, 1970

[21] Appl. No.: 58,467

[52] U.S. Cl. ................................................144/2 Z
[51] Int. Cl. ................................................A01g 23/02
[58] Field of Search.....144/2 Z, 3 D, 34 R, 34 E, 309 AC, 144/346 R

[56] References Cited

UNITED STATES PATENTS

| 3,542,099 | 11/1970 | Gibson | 144/3 D |
| 2,989,097 | 6/1961 | Bombardier | 144/2 Z |
| 3,443,611 | 5/1969 | Jorgensen | 144/2 Z |
| 3,498,350 | 3/1970 | Maradyn | 144/3 D |
| 2,948,311 | 8/1960 | McCollum | 144/3 D |
| 3,285,305 | 11/1966 | Nicholson | 144/208 R |
| 3,461,928 | 8/1969 | Siiro | 144/3 D |
| 3,556,183 | 1/1971 | Busch | 144/34 R |
| 3,572,410 | 3/1971 | McElderry | 144/2 Z |
| 3,595,284 | 7/1971 | Landers | 144/2 Z |

FOREIGN PATENTS OR APPLICATIONS

| 135,723 | 7/1960 | U.S.S.R. | 144/2 Z |

Primary Examiner—Gerald A. Dost
Attorney—Fryer, Tjensvold, Feix, Phillips & Lempio

[57] ABSTRACT

A delimbing assembly as part of a tree harvester, the harvester preferably also including a drive mechanism for gripping trees and axially moving them through the delimber and a shear assembly enabling the harvester to cut standing trees and delimb them, the delimbing assembly including a pair of flexible blades made up of pivoted links each having a sharpened edge, one end of each flexible blade being secured to a frame member in offset relation to each other, the free ends of the blades being connected to levers which are pivoted to the frame and controlled by a hydraulic motor for separating the blades to receive a tree and then overlapping them to provide a substantially continuous cutting edge about the periphery of the tree.

6 Claims, 4 Drawing Figures

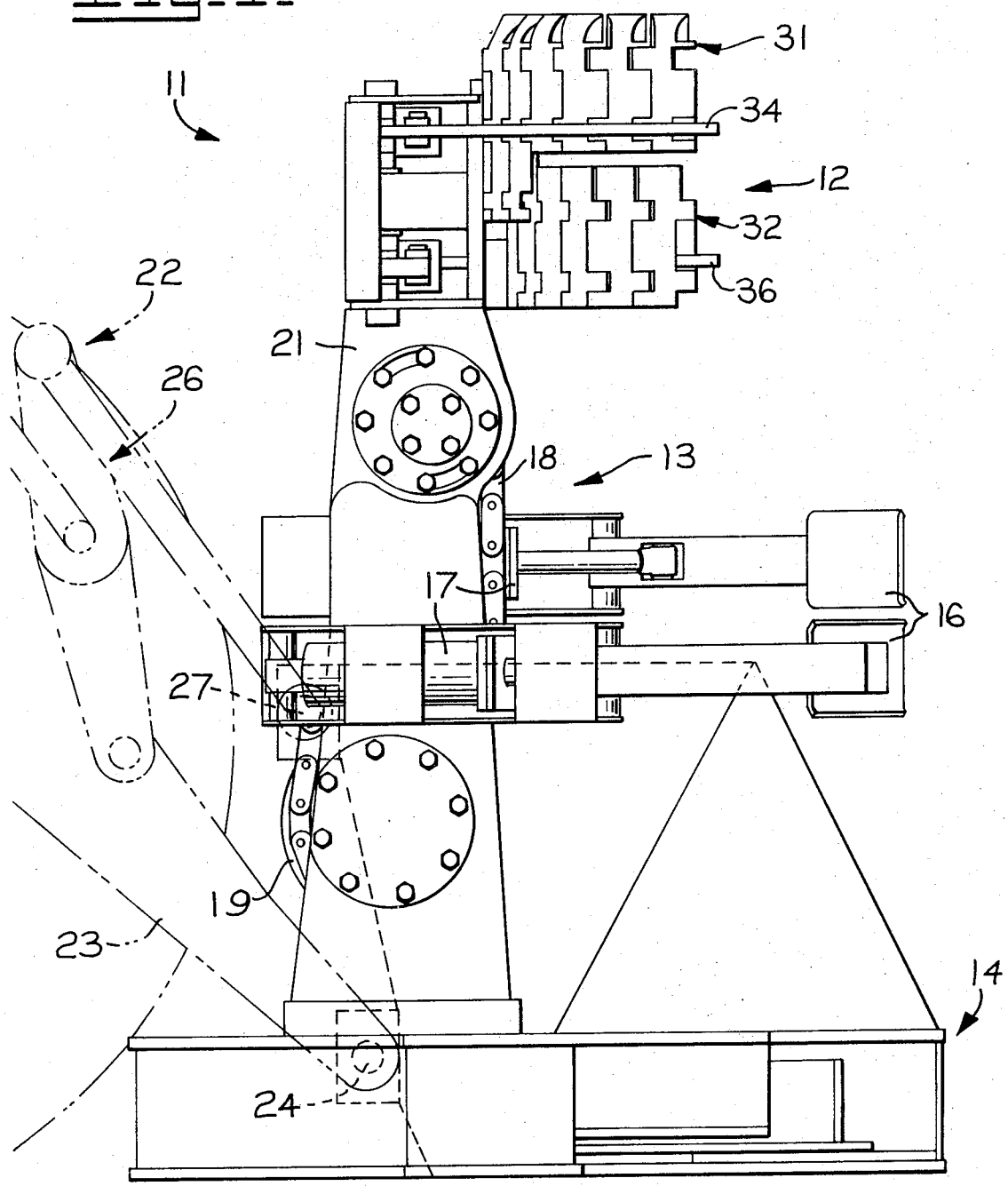

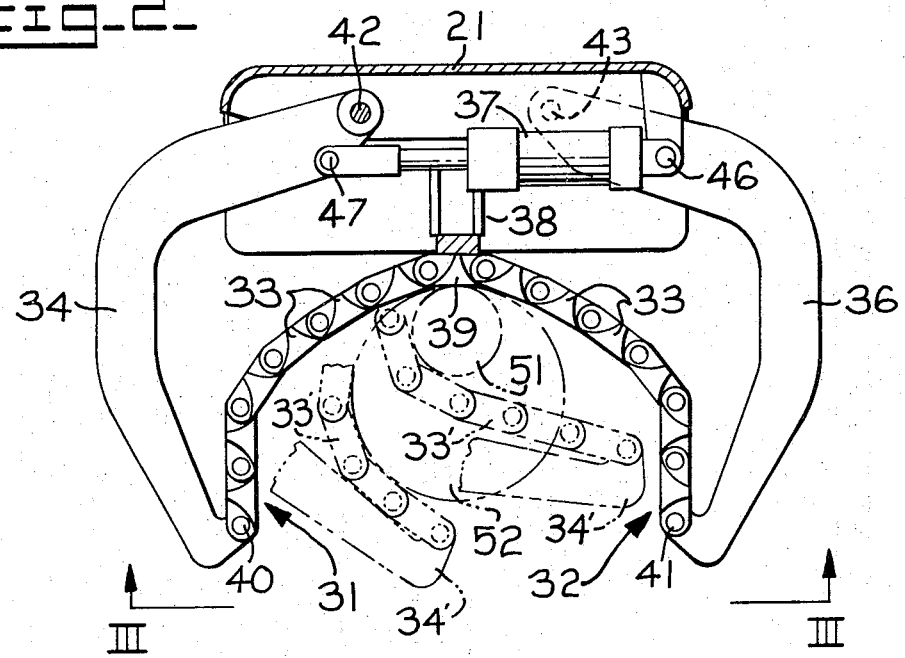
Fig-2-
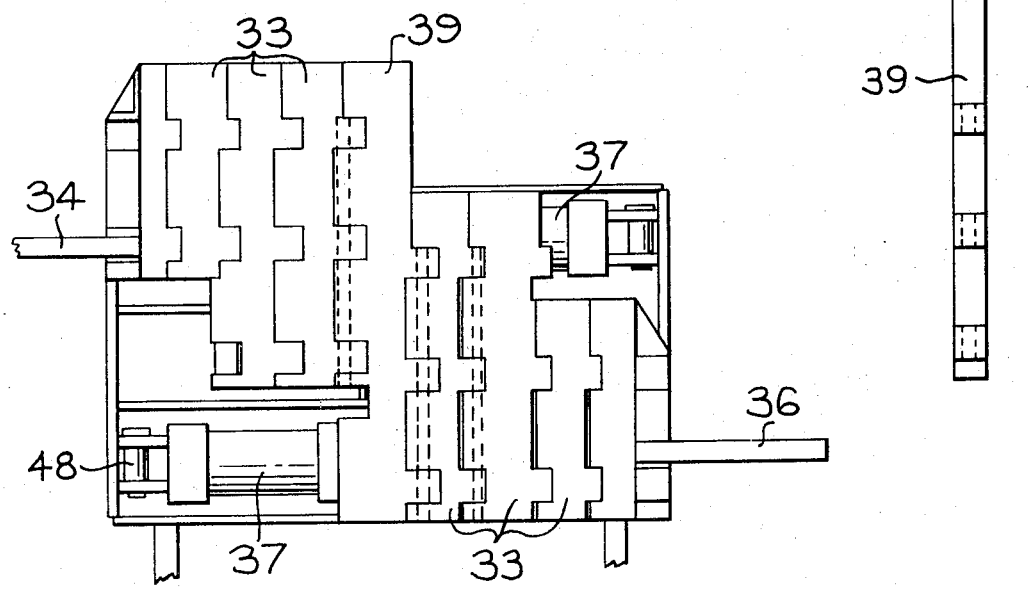
Fig-3-
Fig-4-

DELIMBING ASSEMBLY FOR TREE HARVESTERS

Portions of the present tree harvester, the specific construction of which is not a particular part of the present invention, are described in greater detail in application Ser. No. 58,465, filed by Nathan Gutman et al. on July 27, 1970 and application, Ser. No. 58,466 filed by Raymond L. Moser et al. on July 27, 1970, both of which are assigned to the assignee of the present invention.

The present invention relates to a delimbing assembly as part of a tree harvester which also includes a drive mechanism for gripping the trees and moving them axially through the delimber. The tree harvester may also include other implements for further processing of the trees. In particular, the present tree harvester preferably includes a shear assembly enabling the harvester to cut standing trees and process them into delimbed sections.

The use of a flexible blade assembly in a tree harvester for surrounding the tree in order to delimb it is known in the prior art. For example, various references disclose the use of a single flexible blade assembly which is secured at one end with its other end being looped around the tree and the tree then being axially shifted and delimbed by cutting edges on the flexible blade.

The present invention provides numerous improvements over such an arrangement. In particular, the present delimbing assembly is of particularly simple and compact construction which facilitates its mounting upon a tree harvesting machine. In addition, the present delimbing assembly tends to reduce stresses arising from interaction with the tree as well as minimizing or eliminating the possibility of the delimbing assembly binding on the tree and preventing it from being properly moved through the delimber.

Accordingly, it is an object of the present invention to provide a delimbing assembly for a tree harvester providing one or more of the advantageous features referred to above.

In addition, it is a particular object of the present invention to provide such a delimbing assembly which is of relatively compact construction and tends to eliminate binding interaction with the tree. In order to accomplish this object, two flexible blades are secured at one end to a frame with motor means controlling the free ends of the blades and spreading them apart to receive the tree and then overlapping the free ends of the blades to provide a substantially continuous cutting edge about the tree while urging both blades into constant engagement with the tree as the tree is moved axially therethrough. The blades are also preferably arranged in offset relation to permit engagement with the entire periphery of the tree.

It is a further object to employ such a delimbing assembly as described above together with a drive mechanism mounted on the same frame in alignment with the delimbing assembly for gripping trees and moving them axially through the delimbing assembly, the drive mechanism including an endless track for engagement with the tree and for moving the tree through the delimbing assembly. Such a combination has been found to be particularly effective in the processing of trees in that the drive mechanism tends to more effectively grip and axially shift the tree while the delimbing assembly tends to prevent binding interaction with the tree. Thus, the combination of the present delimbing assembly and the drive mechanism as described above novelly functions to facilitate delimbing operations. Still further, the present delimbing assembly either alone or in combination with the particular drive mechanism referred to above, is particularly adaptable for mounting on a tree harvester as will be discussed in greater detail within the following description.

Other objects and advantages of the present invention are made apparent in the following description having reference to the accompanying drawings.

IN THE DRAWINGS

FIG. 1 is a side elevation view of tree harvesting apparatus for mounting on a vehicle, the apparatus including a delimbing assembly constructed according to the present invention together with a shear assembly and a drive mechanism for gripping and axially shifting trees through the delimber;

FIG. 2 is a plan view of the delimbing assembly which is also shown at the top of FIG. 1;

FIG. 3 is a view taken along section lines III—III of FIG. 2 to particularly illustrate the construction of the two flexible blades, each comprised of a plurality of pivoted elements; and FIG. 4 is a side view of one of the elements in the flexible blades of FIG. 3.

Referring particularly to FIG. 1, a preferred embodiment of a tree harvester apparatus constructed according to the present invention is indicated at 11 including a delimbing assembly 12, a drive mechanism indicated at 13 for gripping trees to be processed and axially shifting them through the harvester apparatus and a shear assembly indicated at 14. The drive mechanism and the shear assembly 14 are described in greater detail by the two references noted above. For purposes of the present invention, it is sufficient to note that the shear assembly 14 is effective to sever or cut trees which are properly arranged within the harvester apparatus.

With regard to the mechanism 13, it includes a pair of gripping arms or grapples 16 which may be moved in opposition to each other by means of hydraulic motors 17 in order to firmly secure a tree against a drive mechanism 18. The drive mechanism 18 is preferably formed as an endless track or chain assembly arranged for rotation upon the harvester apparatus by means of rollers and sprockets, one of which is partially shown at 19. Such a drive mechanism has been found to be particularly effective in combination with the delimbing assembly described below and forms a preferred embodiment of the present invention together with the delimbing assembly.

Also in the preferred embodiment of the present invention, the delimbing assembly 12, the mechanism 13 and the shear assembly 14 are all supported upon a common frame structure 21 which may be mounted upon a vehicle such as that partially shown in phantom at 22. The vehicle is of a type having conventional lift arms, one of which is indicated at 23 with the frame 21 being secured to the lift arms 23 by means of horizontal pivots such as that indicated at 24. A conventional tilt linkage 26 on the vehicle is also pivoted to the frame 21 at a location 27 above the pivot axis 24 with the tilt linkage being effective to pivot the frame 21 and the various portions of the tree harvester about the horizontal pivot 24.

In operation, the tree harvester apparatus is positioned by the vehicle to receive a standing tree within the shear assembly, the grapples 16 and the delimbing assembly 12. The grapples 16 are moved by the motors 17 to secure the tree against the drive track 18 and the delimbing assembly is engaged with the tree in a manner described in greater detail below. The tree is then severed by the shear assembly after which the top of the tree harvester is rotated forwardly and downwardly by the tilt linkage 26 so that the tree is in generally a horizontal position. The tree may then be shifted axially through the delimbing assembly and toward the shear assembly by the track 18 so that the delimbing assembly may operate to remove limbs from the tree. During this mode of operation, the shear assembly 14 may be intermittently operated to also cut the delimbed tree into appropriate lengths.

Construction features of the delimbing assembly 12 are also illustrated in FIGS. 2-4. Major components of the delimbing assembly include a portion of the frame 21, two flexible blades 31 and 32, each comprised of a plurality of pivoted elements or links 33. Motor means for positioning the two flexible blades comprises a pair of arms or levers 34, 36 and hydraulic jacks 37, interconnected respectively between the frame and each of the levers.

As best seen in FIGS. 2 and 3, one end of each flexible blade is secured to a central portion 38 of the frame 21 by means of a central member 39.

The elements 33 are connected to the central member in offset relation to permit complete encirclement of the trees by the two blades 31 and 32. The elements are preferably of increased length adjacent the central member 39 to provide a stronger mounting for the blades 31 and 32.

The free ends 40 and 41 of the two flexible blades are secured respectively to the levers 34 and 36. As best seen in FIG. 2 the levers 34 and 36 are respectively pivoted at 42 and 43 to the frame 21 on opposite sides of the central portion 38. The levers 34 and 36 extend outwardly from the frame and then angle toward each other in order to facilitate proper positioning of the flexible blades 31 and 32.

As particularly seen in FIG. 4, the upper end of each of the blade elements and the central member 39 (as viewed for example in FIGS. 1 and 3) forms a cutting edge such as that indicated at 44. The cutting edges thus face opposite to the direction in which a tree is moved through the harvester apparatus by the drive mechanism 18 shown in FIG. 1. As best seen in FIGS. 2 and 3, one of the hydraulic jacks 37 is pivotally connected at 46 to the frame 21 and at 47 to the lever 34 in spaced apart relation with its pivotal connection 42 on the frame. The other hydraulic jack 37 is similarly interconnected between the frame and the lever 36, the pivotal interconnection between the jack and the frame 21 being indicated at 48.

In operation of the delimbing assembly, the free ends 40 and 41 of the flexible blades are moved apart from each other by the jacks 37 acting through the levers 34 and 36 to the position shown in solid lines on FIG. 2 for receiving a tree. When a tree is properly positioned within the tree harvester apparatus, the jacks 37 are then retracted so that the levers tend to move the free ends of the flexible blades into overlapping position. The overlapping position for one of the flexible blades 31 and the associated lever 34 is shown in phantom (as indicated by primed numerals) to engage trees of various sizes such as those represented in phantom at 51 and 52. It is apparent that for any size tree the two flexible blades may be brought into varying degrees of overlap depending upon the size of each tree for providing, together with the central member 39, a substantially continuous cutting edge around the entire circumference of the tree.

Within an arrangement of the type described above, the hydraulic jacks 37 may apply constant force to urge the elements of both flexible blades into constant engagement with the tree. By further providing common fluid communication to both of the jacks 37 through hydraulic circuitry (not shown), the two flexible blades may also be urged into engagement with the tree under equal force. Thus, each of the flexible blades may separately adjust to conform with varying configurations of that portion of the tree with which each flexible blade is in engagement. Since the circumference of the trees tends to decrease upwardly along their trunks, this arrangement of the two flexible blades, the two levers and the two hydraulic jacks is particularly effective to maintain constant engagement between various portions of the blades and the entire circumference of the tree.

It is further apparent that with trees of greater circumference, the free ends of the two flexible blades may not actually be in overlapping engagement. However, to provide effective delimbing, it is generally desirable that the two flexible blades be sufficiently long so that their free ends 40 and 41 are relatively close to each other when they are wrapped around any tree by the levers 34 and 36. After the tree has completely passed through the delimbing assembly under the influence of the drive track 18, the flexible blades may be again opened to the position shown in FIG. 2 to receive another tree for processing.

In the claims:

1. A tree harvester assembly for mounting on a vehicle comprising drive means for gripping and axially moving a tree and delimbing means arranged for engagement with the three held by the drive means, the delimbing means including:
   a frame,
   a central member secured to the frame,
   a pair of elongated, flexible blades each secured at one end to the central member, and having a number of pivotably interconnected elements, the elements of the two blades and the central member each having a cutting edge, the two flexible blades being arranged in axially offset relation,
   two levers being pivoted to the frame at points behind and laterally spaced from the connection of said blades to said central member and respectively connected to the free ends of the blades, and
   hydraulic motor means parallel to a line connecting the arm pivot points, effectively interconnected between the frame and the levers at pivot points on said frame and adjacent said lateral pivot points, the motor means and levers being arranged for moving the free ends along overlapping arcuate paths into a first position forming an opening for receiving the tree and into a second position where the free ends overlap in varying degrees depending on the size of each tree so that portions of both blades and the central member are in close contact with the entire circumference of the tree, the motor means being effective in the second position to positively urge both blades into constant engagement with the tree as it is moved axially by the drive means.

2. The tree harvester of claim 1 wherein one end of each lever is pivoted to the frame on an opposite side of the central member, the other ends of the levers extending outwardly from the frame and angling toward each other to respectively support the free ends of the flexible blades, the motor means comprising a respective hydraulic jack pivotally interconnected with the frame and both levers adjacent the one end of each, the two blades each comprising a plurality of hinged elements each having a cutting edge, the cutting edges of the plurality of elements in the blades and the central member cooperating to form substantially continuous cutting surfaces when the blades are overlapped about the tree.

3. The tree harvester assembly of claim 1 further comprising a shear assembly also supported on the frame together with the drive means and delimbing means.

4. A tree harvester assembly for mounting on a vehicle comprising drive means for gripping and axially moving a tree and a delimbing assembly arranged for engagement with the tree held by the gripping means, the delimbing assembly including:

a frame, a pair of elongated, flexible blades each having one end secured to the frame and being formed from a number of pivotably interconnected elements having sharpened edges, the two flexible blades being arranged in axially offset relation with each other and each having a free end, two levers each pivoted at one end to the frame at points behind and laterally spaced from the connection of said blades to said frame, the other ends of the levers extending outwardly from the frame and angling toward each other to support the respective free ends of the flexible blades, and motor means parallel to a line connecting the arm pivot points effectively coupled with the frame and levers at pivot points on said frame and adjacent said lateral pivot points, the motor means being arranged for separating the free ends of the blades to form an opening for receiving the tree and for overlapping the free ends of the blades to present a substantially continuous cutting edge in close contact with the entire circumference of the tree, the motor means being further effective to positively urge the free ends of the blade means into overlapping engagement with the tree.

5. A tree harvester assembly for mounting on a vehicle comprising drive means for gripping and axially moving a tree and a delimbing assembly arranged for engagement with the tree held by the gripping means, the delimbing assembly including a frame, a pair of elongated, flexible blades each having one end secured relative a portion of the frame and being formed from a number of pivotably interconnected elements having sharpened edges, the two flexible blades being arranged in axially offset relation with each other and each having a free end, lever means being interconnected between the frame and the free ends of the blades, and motor means effectively coupled with the frame and the free ends of both blades through the lever means, the motor means being arranged for separating the free ends of the blades to form an opening for receiving a tree and for overlapping the free ends of the blades to present a substantially continuous cutting edge in close contact with the entire circumference of the tree, the motor means being further effective to positively urge the free ends of the blade means into overlapping engagement with the tree, the drive means being mounted on the same frame as the delimbing assembly and including an endless track arranged for rotation on the frame, the track having projections along its length for engaging the tree, motor means for operating the track and gripping members for securing the tree against a portion of the endless track, the endless track and gripping members being arranged on the frame to support and axially drive the tree through the delimbing assembly.

6. The tree harvester of claim 5 wherein a shear assembly for severing the tree is arranged on the frame in axial alignment with the drive means opposite the delimbing assembly, the frame being pivotally mounted on the vehicle to permit engagement of the tree by the drive means and pivoting of the frame and the severed tree into a position suitable for moving the tree through the delimbing assembly by the drive means.

* * * * *